Feb. 18, 1958 D. G. DYKEMAN ET AL 2,824,036
METHOD OF ASSEMBLING AND LAYING A FLOOR COVERING
Filed Oct. 3, 1956 4 Sheets-Sheet 1

INVENTORS
DAVID GRANT DYKEMAN
EDMUND JOSEPH TURGEON
BY
Maybee & Legris
ATTORNEYS.

Feb. 18, 1958 D. G. DYKEMAN ET AL 2,824,036
METHOD OF ASSEMBLING AND LAYING A FLOOR COVERING
Filed Oct. 3, 1956 4 Sheets-Sheet 3
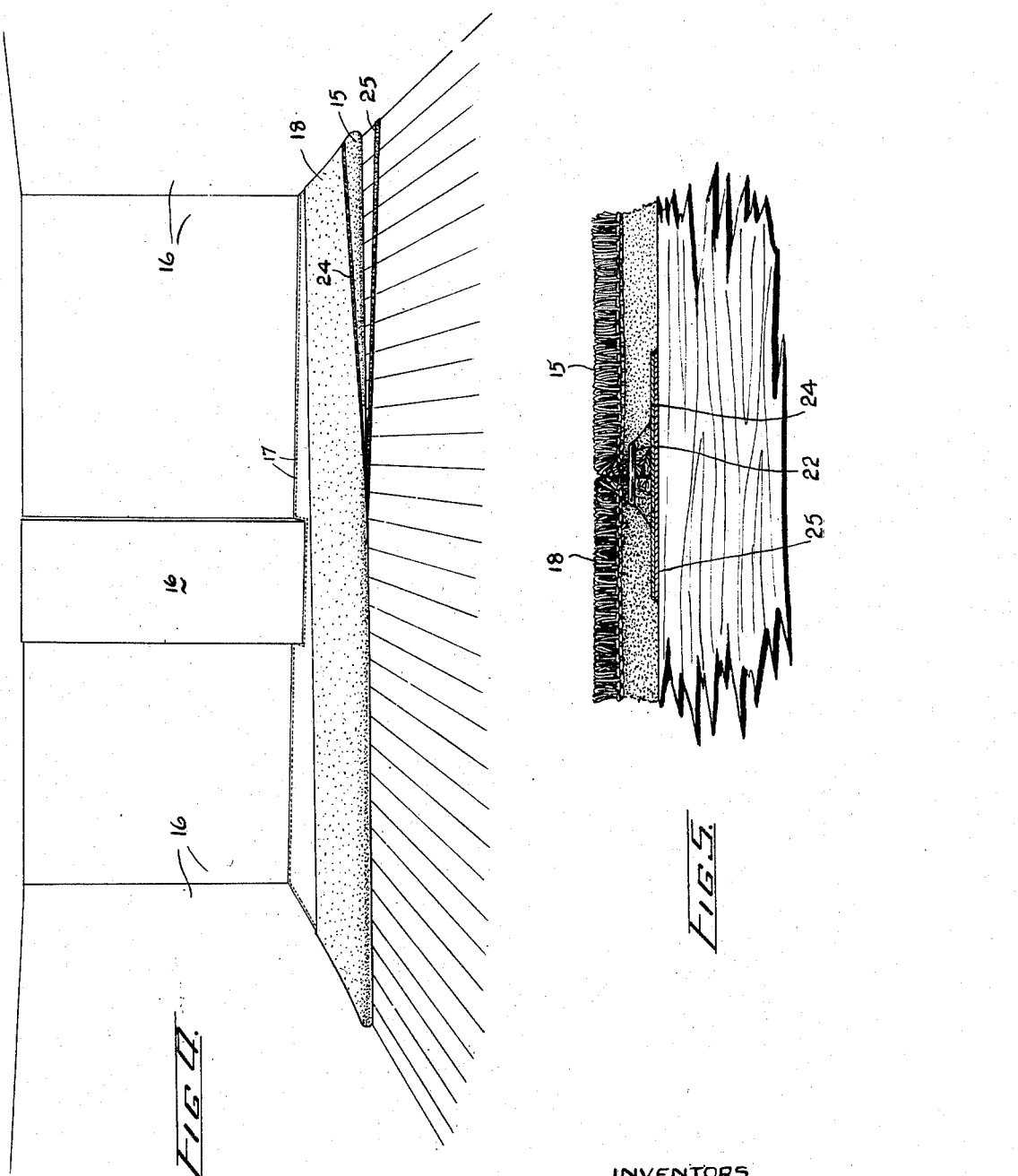
INVENTORS
DAVID GRANT DYKEMAN
EDMUND JOSEPH TURGEON
BY
Maybee & Legris
ATTORNEYS Feb. 18, 1958     D. G. DYKEMAN ET AL     2,824,036
METHOD OF ASSEMBLING AND LAYING A FLOOR COVERING
Filed Oct. 3, 1956     4 Sheets-Sheet 4

INVENTORS
DAVID GRANT DYKEMAN
EDMUND JOSEPH TURGEON
BY
Maybee & Legris
ATTORNEYS

United States Patent Office 2,824,036
Patented Feb. 18, 1958

2,824,036
METHOD OF ASSEMBLING AND LAYING A FLOOR COVERING

David Grant Dykeman and Edmund Joseph Turgeon, North York, Ontario, Canada

Application October 3, 1956, Serial No. 613,715

9 Claims. (Cl. 154—116)

---

This invention relates to a method of assembling and laying a floor covering, and is particularly concerned with the assembling and laying of foamed rubber or plastic sheeting of the kind having a wear resistant facing provided by a woven pile fabric, the sheeting simulating loomed carpeting. The method of the invention also has application in the assembling and laying of foamed rubber or plastic sheeting which is to form an underlay for a loomed carpet, or which has a hard rubber or plastic facing to increase its wear resistance.

A major problem which is encountered when assembling and laying sheeting of this kind is the great difficulty experienced in sewing together adjacent edges of two strips of sheeting to form a continuous floor covering. This is due to the high frictional restraint imposed on the needle used for sewing the material, which makes the task an extremely arduous one, and which results in the breaking of needles and fraying of the thread. This problem is also encountered when applying an edge binding to the strip of sheeting or assembled floor covering.

A further problem which is encountered is that the sheeting of the type referred to is readily stretchable; which disadvantage is highly objectionable in large expanses of floor covering, where the sheeting ruffles easily and tends to "creep" across the floor.

An object of the invention is to provide an improved method of joining those edges of the strips which are to be adjacent to each other.

A further object of the invention is to provide an improved method of reducing "creep" in the assembled floor covering.

A further object of the invention is to provide an improved method of edge binding the sheeting.

Further objects and advantages of the invention will become apparent from a study of the following description when taken in conjunction with the accompanying drawing in which:

Figures 1 to 4 are diagrammatic perspective views illustrating the steps of laying a key strip of the sheeting and subsequently joining a second strip of sheeting to one of the edges of the first strip;

Figure 5 is a fragmentary section through the assembled joint and also showing a portion of the associated flooring; and, Figures 6 to 8 are diagrammatic perspective views illustrating the steps of edge binding the sheeting, Figure 9 being a fragmentary section through the finished binding.

Figure 1:
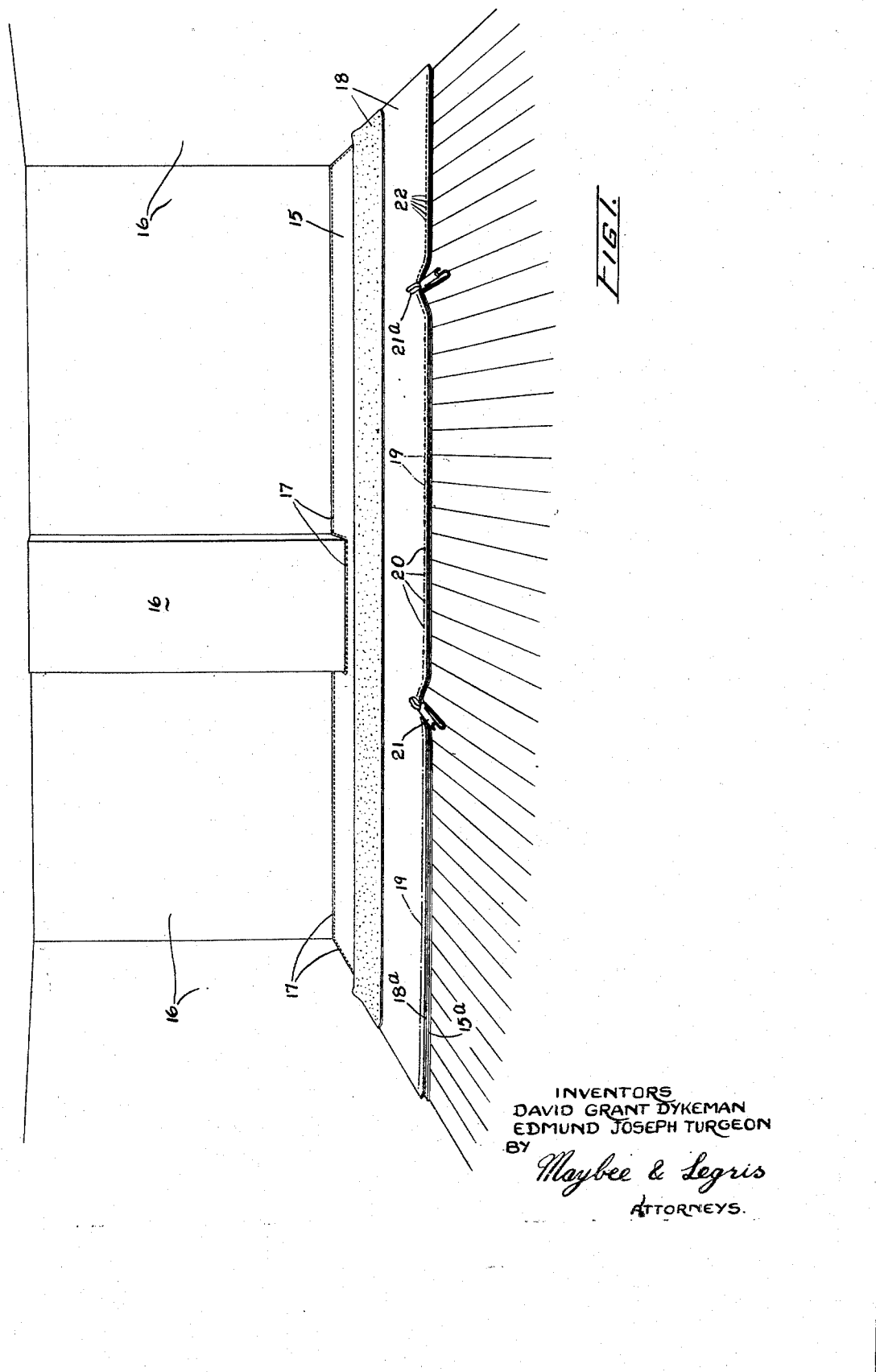

Referring firstly to Figure 1, a strip 15 of the sheeting is laid on the floor with its fabric facing uppermost, and, if the covering is to be fitted (as opposed to being in the form of a rug), it is closely fitted to the surrounding walls 16 and is securely tacked to the floor, as indicated at 17, using a trigger-type staple gun. If the edges of the strip adjacent the wall are not to be subsequently covered by the usual molding, they are edge bound by the method hereinafter fully described and then secured to the floor by means of an adhesive strip.

The next step is to lay a second strip 18 on top of the first one 15 with its fabric facing mutually presented to the fabric facing of the first strip and the edges 15a, 18a to be joined are brought into alignment. If the facings are patterned and it is necessary to match the pattern, the second strip 18 is first placed alongside the first strip with its fabric facing uppermost and the patterns are matched, the strips then being provided with reference markings on their edges 15a, 18a or backs.

A line 19 is then drawn on the back of the second strip 18 parallel to the edge 18a and spaced inwardly of the edge to an extent permitting accurate matching of the patterned face in a direction lateral to the joint to be made, that line usually being exactly one half of an inch from the edge 18a. Where the facings are not patterned, the line should be drawn about one half of an inch inwardly from the edge to provide for subsequent removal of the edge, as the edge is usually of varying thickness.

The next step is to baste stitch the edges of the first and second strips together at intervals of approximately six inches and along the line 19 using staples, the staples being indicated at 20. Where the staple gun used has a thin anvil which can be inserted between the strip 15 and the floor without lifting the strips to any material extent, the stapling operation can be carried out without further adjustment of the strips, but, however, as the staple gun used is preferably of the plier's type indicated at 21, the strip 18 is moved for its edge 18a to be spaced from the edge 15a of the strip 15 by a distance approximately equal to the thickness of the sheet material, for example, one-eighth of an inch. The edges 15a, 18a are then bent or turned upwardly and are stapled, the edges when so bent returning into alignment due to their respective radii of curvature. The basting locates the edges against further displacement.

Figure 2:
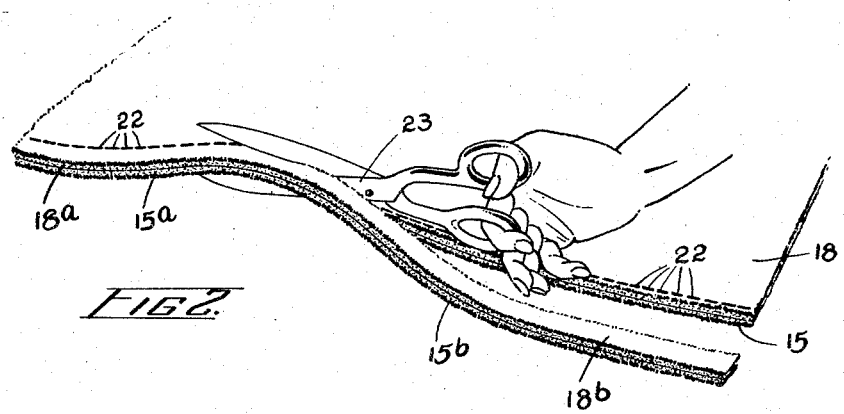

After the edges have been basted, they are stapled together at closely spaced intervals and along the line 19 to form a continuous line of stitching as indicated at 22 using a staple gun 21a similar to the gun 21. The waste edging 15b, 18b is then trimmed off at a distance approximately one-eighth of an inch from the stapled line and preferably not greater than the thickness of the sheeting, using shears 23 as is indicated in Figure 2.

Figure 3:
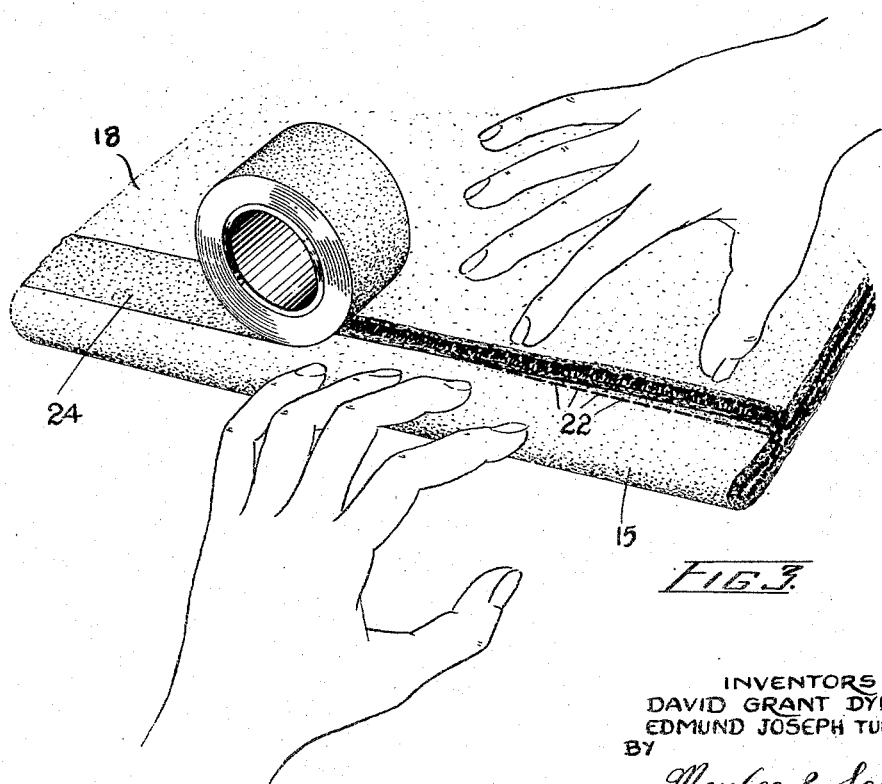

The joint thus formed is then moved to lie over the surface of the first strip 15, as is indicated in Figure 3, and the joint is spread in a direction lateral to the joint to flatten it, a length 24 of self-adhesive tape then being applied to the back of the sheeting to mask the joint.

The tape 24 is preferably adhesive on both sides so that when the strips 15 and 18 are rolled to lie flat on the floor with their fabric facing uppermost the tape will adhere to the floor and locate the strips against rucking or "creep," and to further facilitate this and as indicated in Figure 4, preferably a strip of tape 25 which is adhesive on both sides is applied to the floor and forced firmly into position at a position at which it can engage the tape 24 when the strips are so rolled over.

The ends of the strip 18 are then stapled to the floor and trimmed if the strip is overlength, and the method is repeated until the complete floor area is covered.

As there is a tendency for the joint to shrink in length owing to the pinching effect of the staples, the joint, when the covering is laid, is preferably stapled to the floor at one end and then gently stretched to its full length from the other end, the tape 24 when forced into contact with the floor holding the joint in that position. If desired the joint can also be stapled to the floor at the other end of the joint.

The joint, when completed, has an appearance in cross-section as indicated in Figure 5 where it will be observed that the sheeting mitres into itself to form a joint of a thickness substantially continuous to that of the sheet material.

Where the free edges of the completed floor covering are not to be obscured by a wall molding, the edges are preferably bound as indicated in Figures 6 to 9.

Figure 6:
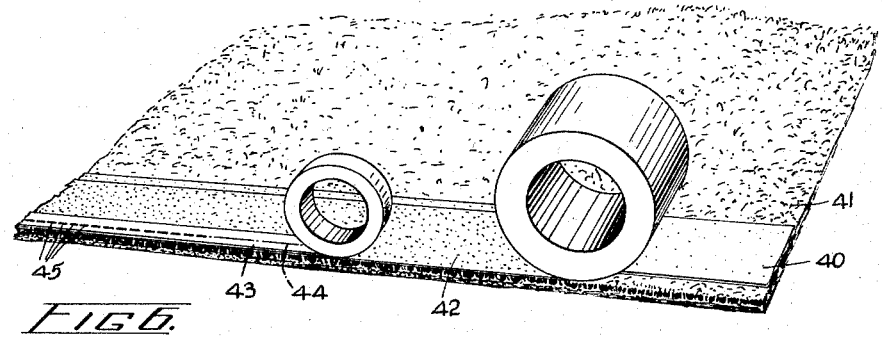
Figure 7:
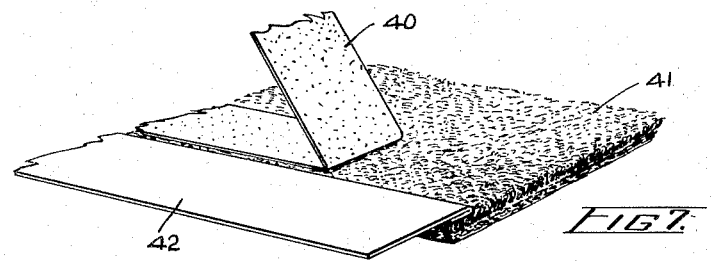
Figure 8:
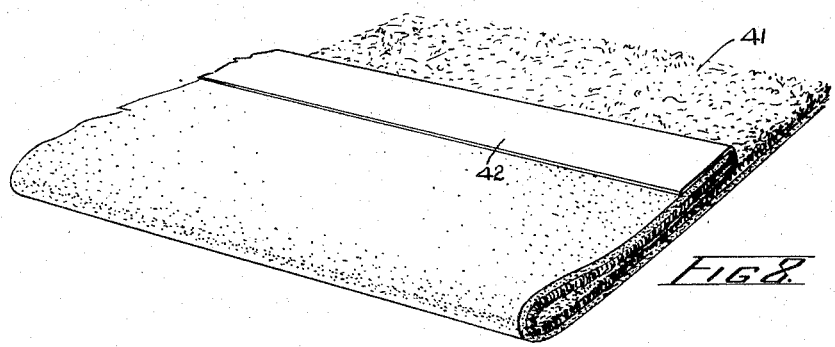

As shown in Figure 6, a length 40 of tape, which is adhesive on both sides, is first applied to the fabric facing of the sheeting 41 parallel to the edge to be bound, the tape being spaced inwardly from the edge by about three-eighths of an inch. A further length 42 of tape is then laid with one of its edges in alignment with the edge of the sheeting, the upper surface only of the tape 42 being coated with an adhesive. The tape 42 is pressed into contact with the tape 40 to locate it against displacement, and then a further length 43 of, for example, paper tape is laid on the tape 42 in alignment with the edge of the sheeting, the tape 43 providing a suitable base on which a line 44 can be drawn approximately one quarter of an inch in from the edge of the sheeting. The tapes 42 and 43 are then stapled to the sheeting at closely spaced intervals as is indicated at 45, after which the tape 42 is gently pulled off the surface of the tape 40 and is folded through 180° as is indicated in Figure 7. It will be noted that the staples do not pass through the tape 40, and that tape can be then removed for reuse.

The edge of the sheeting is then turned through 180° as is indicated in Figure 8 and the tape 42 is again turned through 180° and pressed into contact with the back of the sheeting, to which it adheres. If desired, the adhesion can be improved by ironing the tape onto the sheeting using a cool iron.

Figure 9:

The finished binding has the appearance in cross-section of that shown in Figure 9, and, if desired, the edge of the covering can be attached to the floor by pressing it onto a strip of tape which is adhesive on both sides and which has previously been applied to the floor.

Obviously, if desired, the tape 42 could have a portion of its surface uncoated with adhesive to dispense with the necessity of providing the paper tape 43, and the tape 42 could additionally be provided over that portion of its width which is to be at the back of the sheeting with a coating of adhesive to dispense with the necessity of providing a separate strip for securing the covering to the floor.

It will be seen that the method of the invention is simple to carry out and overcomes disadvantages which have previously limited the utility of the type of sheeting referred to, which disadvantages have previously militated against the use of that type of sheeting.

While the method above described with reference to the accompanying drawings may be considered to be the best method, it will be apparent that changes may be made in the order of carrying out the steps, and it will be appreciated that such changes are included in the scope of the appended claims.

What we claim as our invention is:

1. In a method of assembling and laying strips of sponge sheeting having a fabric facing to provide a floor covering, the method of joining those edges of the strips which are to be adjacent to each other, including the steps of laying a first strip on a floor surface with its fabric facing presented upwardly; laying a second strip on top of the first strip in a predetermined position and with its fabric facing mutually presented to the fabric facing of the first strip; marking a line on the then upwardly presented face of the second strip at a position at which it is desired to join the strips; stapling the two strips together along the said line at spaced intervals to provide a basting; further stapling the two strips together along the said line at closely spaced intervals intermediate the basting staples to form a stapled joint; trimming away that portion of the strips between the line of staples and the adjacent edge of the strips along a line substantially parallel to the line of staples and at a distance from the staples substantially equal to the thickness of one of the strips; moving the second strip to position the stapled joint over the first strip; spreading the first and second strips in opposite directions and in a direction lateral to the direction of the joint to cause the joint to flatten; applying a length of tape over the joint to mask the joint; and adhering the tape to the strips.

2. The method according to claim 1, in which, prior to the stapling operation, the second strip is moved a distance substantially equal to the thickness of the second strip in a direction away from the edge of the first strip, the strips then being bent upwardly from the floor surface in proximity to the said line to facilitate the stapling operation.

3. In the method of assembling and laying strips of sponge sheeting having a fabric facing to provide a floor covering, the method of joining those edges of the strips which are to be adjacent to each other, including the steps of laying a first strip on a floor surface with its fabric facing presented upwardly; laying a second strip on top of the first strip in a predetermined position and with its fabric facing presented to the fabric facing of the first strip; marking a line on the then upwardly presented face of the second strip at a position at which it is desired to join the strips; stapling the two strips together along the said line at spaced intervals to provide a basting; further stapling the two strips together along the said line at closely spaced intervals intermediate the basting staples to form a stapled joint; trimming away that portion of the strips between the line of staples and the adjacent edge of the strips along a line substantially parallel to the line of staples and at a distance from the staples substantially equal to the thickness of one of the strips; moving the second strip to position the stapled joint over the first strip; spreading the first and second strips in opposite directions and in a direction lateral to the direction of the joint to cause the joint to flatten; applying a length of tape which is adhesive on both sides over the joint to mask the joint, moving the second strip for its fabric facing to be presented upwardly with the length of tape presented to the floor surface; and forcing the tape into contact with the floor surface to secure the joint to the floor surface.

4. The method according to claim 3, in which a further length of tape which is adhesive on both sides is applied to the floor surface at a position for it to lie under the first mentioned length of tape when the first mentioned length of tape is presented to the floor surface; the first and further lengths of tape being forced into intimate contact to secure the joint to the floor surface.

5. The method according to claim 3, in which, prior to the stapling operation, the second strip is moved a distance substantially equal to the thickness of the second strip in a direction away from the edge of the first strip and the strips are then bent upwardly from the floor surface in proximity to the said line to facilitate the stapling operation.

6. In a method of assembling strips of sponge sheeting having a fabric facing to form a continuous floor covering sheet, the steps of joining those edges of the strips which are to be adjacent to each other, including laying a first strip on a floor surface with its fabric-facing presented upwardly; laying a second strip on top of said first strip in a predetermined position and with its fabric-facing mutually presented to the fabric-facing of the first strip; marking a line on the then upwardly presented face of the second strip at a position at which it is desired to join the strips; stapling the two strips together along the line at spaced intervals to provide a basting; further stapling the two strips together along said line at closely spaced intervals intermediate the basting staples to form a stapled joint; trimming away that portion of the strips between the line of staples and the adjacent edge of the strips, along a line substantially parallel to the line of staples and at a distance from the staples substantially equal to the thickness of one of the strips; moving the second strip to position the stapled joint over the first strip; spreading the first and second strips in opposite directions and in a direction lateral to the direction of the joint to cause the joint to flatten; applying a length of tape over the joint to mask the joint; and adhering the tape to the strips: in combination with the steps of binding each edge which constitutes a free edge of the joined strips, including applying a first length of tape which is adhesive on both sides to the fabric-facing of the joined strips at a position substantially parallel to a free edge of the joined strips and spaced from that edge by a distance which is substantially equal to the thickness of one of the strips; applying a second length of tape which is adhesive on one side to the first length of tape with one of its edges in alignment with the adjacent free edge of the joined strips and with its adhesive surface positioned remote from the fabric-facing; forcing the second length of tape lightly into contact with the mutually presented adhesive surface of the first length of tape to locate the second length of tape; stapling the second length of tape to the joined strips at closely spaced intervals along a line extending substantially parallel to the free edge of the joined strips and at a position between the said free edge of the joined strips and the adjacent edge of the first length of tape; stripping the second length of tape from the first length of tape; folding the said second length of tape through substantially 180°; moving the joined strips for the said free edge to lie over the fabric-facing of the joined strips; folding the second length of tape through a further 180° to position its adhesive surface adjacent the back of the joined strips; forcing the second length of tape into intimate contact with the back of the joined strips to adhere it to the said back; and subsequently stripping the said first length of tape from the fabric-facing of the joined strips.

7. The method according to claim 6, in which the tape used for masking the joint is adhesive on both sides and is subsequently forced into contact with the floor surface.

8. The method according to claim 6, in which, when joining the edges of adjacent strips and prior to the stapling operation, the second strip is moved a distance substantially equal to the thickness of the second strip in a direction away from the edge of the first strip; and the strips are then bent upwardly from the floor surface and adjacent the said line to facilitate the stapling operation.

9. The method according to claim 6, in which the tape used for masking the joint is adhesive on both sides and is subsequently forced into contact with a length of tape which is adhesive on both sides and which previously has been applied to the floor surface.

References Cited in the file of this patent

UNITED STATES PATENTS

| | | |
|---|---|---|
| 1,136,380 | Terry | Apr. 20, 1915 |
| 1,842,746 | Chance | Jan. 26, 1932 |
| 2,069,310 | Higgins | Feb. 2, 1937 |
| 2,589,929 | Dildilian et al. | Mar. 18, 1952 |